Dec. 14, 1937.     J. G. NUTTER     2,102,379
BEET TOPPING MACHINE
Filed March 21, 1932
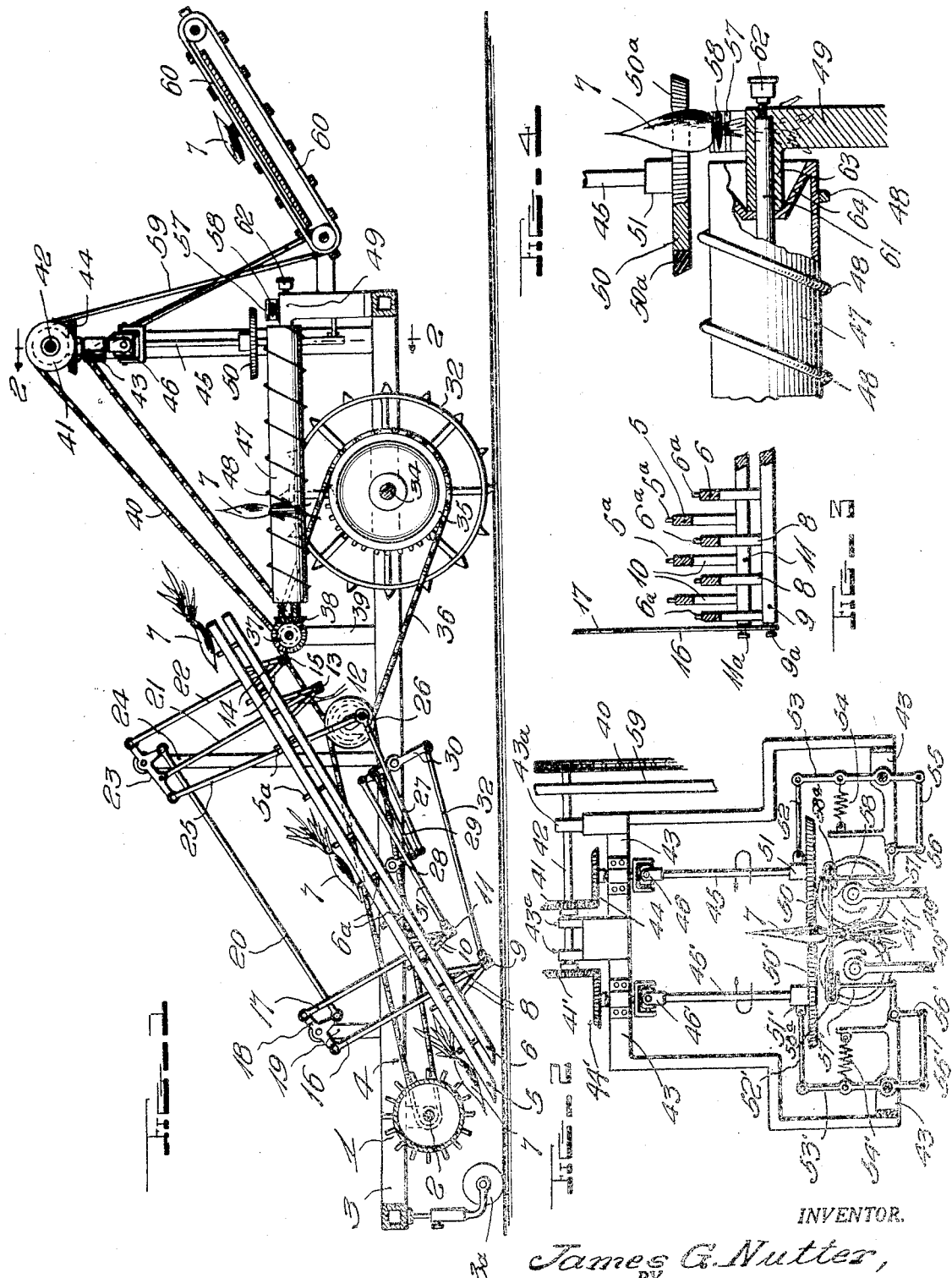
INVENTOR.
James G. Nutter,
BY
Ben J. Chrony
ATTORNEY.

Patented Dec. 14, 1937

2,102,379

UNITED STATES PATENT OFFICE 2,102,379

BEET-TOPPING MACHINE

James G. Nutter, Round Grove Township, McLeod County, Minn.

Application March 21, 1932, Serial No. 600,326

6 Claims. (Cl. 55—107)

This invention relates to beet topping and gauging machines generally. More specifically this invention relates to machines for topping beets and like vegetables after they have been removed from the ground.

An object of this invention is to provide a machine adapted to gauge different vegetables according to size and remove the tops or greens of the different vegetables at the proper point with the minimum expenditure of time and labor.

Another object of this invention is to provide a machine adapted to remove the tops from vegetables, such as beets, carrots, parsnips, rutabaga, onions and the like, wherein a suitable gauging apparatus is provided to adjust the top removing device at the proper level for different sizes of vegetables.

Other and further objects of this invention will be apparent from the following specification and appended claims to those skilled in the art to which it relates.

In accordance with this invention, I provide a machine adapted to be drawn by a tractor, horses, or in other suitable ways, over a row of uprooted vegetables, such as beets and the like, which are loaded upon a conveyor and vibrated, to remove surplus dirt and soil adhering thereto. At the same time the vegetables are conveyed to a mechanism employing two rollers, placed parallel to each other and rotated in opposite directions in such a manner that the tops, including the leaves and stems, are drawn between these rollers. Helical strips are provided to these rollers to move the vegetables longitudinally and axially along the rollers to the top removing and gauging apparatus simultaneously as the tops of the vegetables are drawn between the rollers. As the vegetables are discharged or about to be discharged from the rollers they engage a pair of knife adjusting wheels, which adjust the topping knife to the proper level and maintain the knife at this level until the vegetable passes between these wheels and the vegetable top is removed.

This invention will be more fully and completely understood from the specification and the drawing, in which, briefly, Fig. 1 is a view in side, vertical elevation and partial section of an embodiment of this invention;

Fig. 2 is a view along the lines 2—2 of Fig. 1;

Fig. 3 is a fragmentary sectional view of the conveyor, and

Fig. 4 is a fragmentary sectional view of the top cutting mechanism.

Reference numeral 1 of Fig. 1 designates a spiked wheel, mounted by suitable bearings and a shaft 2 upon the frame 3, to be rotated by the chain or belt 4 and force vegetables 7, such as beets, upon the two sets of bars 5 and 6. Upright pegs 8 are attached to the lower ends of each of the bars 6 to support these bars upon the transverse rod 9. Likewise, upright pegs 10 are provided to the lower ends of bars 5 to support the latter upon the transverse rod 11. Pegs 12 and 14 are employed to support the upper ends of the bars 6 and 5, respectively, upon the transverse rods 13 and 15, respectively.

Rods 16 and 17 are connected to pins 9a and 11a, respectively, of transverse rods 9 and 11, as illustrated in Fig. 3. A double bell crank lever 18 is pivoted on the frame element 19, which is joined to the frame 3. Rods 16 and 17 are pivoted on this lever 18 and function to move the bar sets 5 and 6 up and down in accordance with the movement of this lever by the rod 20, which is also pivotally attached to the lever 18. The double bell crank lever 23 is supported by the upright frame element 24, which is a part of the frame 3, and rod 20 is pivoted to this lever to transmit motion to the bell crank 18. Rods 21 and 22 are attached to pins at the ends of the transverse rods 13 and 14 in the same manner as rods 16 and 17 are attached to pins 9a and 11a (Fig. 3).

Rod 25 is also pivoted to the bell crank lever 23 and is actuated by the crank shaft 26, which is also employed to actuate the rod 27 and the lever 28 to which the rod 29 is connected. The lever 28 is pivoted to the frame 3. The connecting rod 29 causes the lever 30, which is pivotally connected at a central point to the frame 3, to oscillate back and forth about its pivotal point and move the push rods 31 and 32 back and forth. These push rods 31 and 32 function to move the sets of bars 5 and 6 alternately back and forth simultaneously as these sets of bars are alternately moved up and down. These bars of the conveyor are thus given an oscillatory motion in two different directions and the motion of one set of bars is so timed with respect to that of the other set of bars that the vegetables 7 are caused to ascend the bars, being assisted in their upward movement by the small pegs 5a and 6a.

The frame 3 is supported by wheels 33 and 3a. The wheel 33 is provided with a sprocket wheel 35 and shaft 34 of conventional design. A belt or chain 36 is employed in cooperation with the sprocket wheel 35 to drive the crank 26 and gear 37. The chain 4 is driven from the shaft of the crank 26 by the chain 36 and suitable sprockets.

A bevel gear 38 cooperates with the bevel gear 37 to drive the roller or cylinder 47. A spiral strip 48 wound in the form of a helix about the cylinder 47 is employed to stand the beets 7 into upright position and move them toward the wheels 50. Two cylinders 47 are employed side by side; however, only one of these need be driven by the bevel gear arrangement, inasmuch as the other may be moved by frictional engagement with the one that is driven, as illustrated in Fig. 2.

The chain 40 is employed to drive the shaft 42 through a suitable sprocket wheel. Bevel gears 41 and 41' are mounted on the shaft 42 which is mounted in bearings 43a supported by the frame 43. Bevel gears 44 and 44' cooperate with gears 41 and 41' to drive shafts 45 and 45' and wheels 50 and 50', respectively. Bearings 51 and 51' are positioned on the shafts 45 and 45', respectively, to move the members 52 and 52' in accordance with the size of the vegetable 7 between the wheels 50 and 50'. The movement of these wheels 50 and 50' is transmitted to the ends of the knife 58 through the members 53, 55, 56 and 57 on one end and through the members 53', 55', 56' and 57' on the other end. Springs 58a positioned between the knife 58 and the members 57 and 57' permit some horizontal movement of the knife 58. Thus, if the vegetable between the rubber tired wheels 50 and 50' is large, the knife will be held at a higher level than if it is small. This, of course, may be reversed merely by reversing the bell cranks 56 and 56'. The proper tension is also maintained on these wheels 50 and 50', to prevent too easy spreading thereof, by the springs 54 and 54'. Suitable universal joints 46 and 46' are also provided to the shafts 45 and 45' to permit movement of the wheels 50 and 50' without materially disturbing the operation of the bevel gears 44 and 44'.

The frame 43 is extended to support these members in operative relation, as illustrated. Suitable bearing supports 49 and 49', illustrated in detail in Fig. 4, are provided to each of the rollers 47. The end of the shaft 61 is supported in the bearing 63, which is formed at the end of the frame member 49. A suitable grease cup 62 is also provided to the bearing. The end 64 of the cylinder 47 is disposed at an angle inward, permitting the bearing 63 to extend into the cylinder a short distance to prevent sand and dirt from entering the bearing.

In Fig. 4 the wheel 50 is shown in partial section to illustrate the tire 50a, of rubber or similar material employed on wheels 50 and 50'.

As the beet is passed between the wheels 50 and 50' the knife 58 is adjusted and the top severed from the beet. The beet is then ejected from between these wheels upon the conveyor 60, which is driven by the crossed belt 59. The conveyor is employed to load the beets into a wagon box or other suitable transporting vehicle.

From the foregoing specification it is apparent that I have described this invention in considerable detail; however, I do not desire to limit this invention to those details except in so far as they are defined by the appended claims.

I claim:

1. In vegetable topping machines the combination of a pair of rotatable cylinders disposed axially parallel to each other, means for feeding vegetables to be topped upon said cylinders, means for rotating at least one of said cylinders whereby the tops of said vegetables are drawn between said cylinders, means for passing said vegetables toward one end of said cylinders, a knife for severing the tops of said vegetables therefrom and means for adjusting the position of said knife in accordance with the shape of said vegetable, said last means including a pair of shafts at least one of which is pivotally mounted, and means mounted on said shafts for engaging the vegetables and moving said pivoted shaft according to the size of the vegetables engaged.

2. In vegetable topping machines the combination of a pair of rotatable cylinders disposed parallel to each other, means for feeding vegetables to be topped upon said cylinders, means for rotating said cylinders, means for drawing the tops of said vegetables between said cylinders, means for passing said vegetables toward one end of said cylinders, a knife movable horizontally, means for forcing said vegetables through said knife whereby the tops thereof are severed therefrom, said last means including a wheel and a pivotally mounted shaft, and means for adjusting the position of said knife in accordance with the shapes of said vegetables, said last means being connected to said pivotally mounted shaft.

3. In vegetable topping machines the combination of a knife, means for adjusting the position of said knife in accordance with the shapes of the individual vegetables to be topped, and means including a pair of wheels for feeding vegetables to be topped to said knife, a pair of shafts for said wheels, at least one of said shafts being pivotally mounted, and means for connecting said first means to said pivotally mounted shaft.

4. In vegetable topping machines the combination of a pair of cylinders rotatable in opposite directions, means for conveying vegetables to be topped to said cylinders, helical strips positioned on the surfaces of said cylinders for drawing the tops of said vegetables between said cylinders and standing said vegetables upright, a knife, means for feeding said vegetables to said knife, said last means including a pair of wheels, a pair of shafts for said wheels, at least one of said shafts being pivotally mounted whereby said wheels may be spread apart to accommodate different size vegetables, and means connected to said last means for adjusting said knife to cut the tops from said vegetables at different levels depending upon the shape of the individual vegetable.

5. In vegetable topping machines the combination of a pair of cylinders rotatable in opposite directions, means for conveying vegetables to be topped to said cylinders, means positioned on the surfaces of said cylinders for drawing the tops of said vegetables between said cylinders and standing said vegetables upright, a pair of wheels, shafts for said wheels, said shafts being movable in a direction substantially normal to the direction of rotation thereof when different size vegetables pass between said wheels and means for transmitting the effects of this movement to said knife for adjusting the position of said knife in accordance with the size of the vegetable passing between said wheels.

6. A beet harvester including, a pair of substantially parallel shafts, means for mounting said shafts swingable apart or together, means on said shafts for engaging beets, means for rotating said shafts to move beets engaged, cutting knife means, and means connecting said knife means and said shafts to raise or lower the knife means when the shafts are swung apart or together according to the size of the beet engaged.

JAMES G. NUTTER.